United States Patent
Horng et al.

(10) Patent No.: US 11,808,834 B2
(45) Date of Patent: Nov. 7, 2023

(54) PHASED-ARRAY DOPPLER RADAR USING AN INJECTION-LOCKING TECHNIQUE

(71) Applicant: NATIONAL SUN YAT-SEN UNIVERSITY, Kaohsiung (TW)

(72) Inventors: Tzyy-Sheng Horng, Kaohsiung (TW); Chao-Kai Wen, Kaohsiung (TW); Yi-Chen Lai, Kaohsiung (TW); Yu-Chi Huang, Kaohsiung (TW); Jui-Yen Lin, Kaohsiung (TW); De-Ming Chian, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 353 days.

(21) Appl. No.: 17/101,040

(22) Filed: Nov. 23, 2020

(65) Prior Publication Data
US 2021/0356577 A1  Nov. 18, 2021

(30) Foreign Application Priority Data
May 18, 2020  (TW) .................................. 109116455

(51) Int. Cl.
*G01S 13/02* (2006.01)
*H01Q 21/00* (2006.01)
(Continued)

(52) U.S. Cl.
CPC ............ *G01S 13/02* (2013.01); *G01S 7/4052* (2013.01); *H01Q 21/0025* (2013.01);
(Continued)

(58) Field of Classification Search
CPC ...... G01S 13/02; G01S 7/4052; G01S 7/2886; G01S 7/4069; G01S 2013/0254;
(Continued)

(56) References Cited

U.S. PATENT DOCUMENTS 7,002,511 B1 * 2/2006 Ammar ................... G01S 7/032
                                                      342/134
7,576,682 B1 * 8/2009 Yu ......................... G01S 7/2813
                                                      342/16
(Continued)

FOREIGN PATENT DOCUMENTS

TW          201947252 A       12/2019

OTHER PUBLICATIONS

X. Zhang and A. S. Daryoush, "Full 360 degrees phase shifting of injection-locked oscillators," in IEEE Microwave and Guided Wave Letters, vol. 3, No. 1, pp. 14-16, Jan. 1993, doi: 10.1109/75.180676. (Year: 1993).*

(Continued)

*Primary Examiner* — Bernarr E Gregory
*Assistant Examiner* — Hailey R Le
(74) *Attorney, Agent, or Firm* — Demian K. Jackson; Jackson IPG PLLC (57) ABSTRACT

A phased-array Doppler radar includes a two-way splitter, a transmit antenna, a receive antenna array, an ILO, a demodulation unit and a digital signal processing unit. A reference signal is split by the two-way splitter to the transmit antenna for transmission to targets and the ILO for injection locking. Signals reflected by the targets are received by the receive antenna array as received signals. An injection-locked signal generated by the ILO and the received signals received by the receive antenna array are delivered to the demodulation unit. The received signals are demodulated into baseband I/Q signals by the demodulation unit that uses the injection-locked signal as a local oscillator signal. The baseband I/Q signals are processed by the digital signal processing unit to obtain a digital beamforming pattern.

7 Claims, 6 Drawing Sheets

(51) Int. Cl.
*G01S 7/40* (2006.01)
*G01S 7/288* (2006.01)

(52) U.S. Cl.
CPC .......... *G01S 7/2886* (2021.05); *G01S 7/4069* (2021.05); *G01S 2013/0254* (2013.01)

(58) Field of Classification Search
CPC ... G01S 7/03; G01S 7/358; G01S 7/35; G01S 2013/0263; G01S 13/42; G01S 13/56; G01S 7/415; H01Q 21/0025
USPC .......................................................... 342/84
See application file for complete search history.

(56) References Cited

U.S. PATENT DOCUMENTS

| | | | | |
|---|---|---|---|---|
| 9,846,226 | B2* | 12/2017 | Horng | G01S 13/003 |
| 9,948,409 | B2* | 4/2018 | Kollmann | H03F 3/195 |
| 10,116,066 | B2* | 10/2018 | Schaepperle | H01Q 9/0435 |
| 10,305,610 | B2* | 5/2019 | Kollmann | H03F 3/195 |
| 10,446,938 | B1* | 10/2019 | Wang | H01Q 9/0407 |
| 2016/0187475 | A1* | 6/2016 | Horng | G01S 13/88 |
| | | | | 342/21 |
| 2017/0126296 | A1* | 5/2017 | Molev Shteiman | H04B 7/0617 |
| 2018/0083358 | A1* | 3/2018 | Wang | G01S 13/87 |
| 2018/0338730 | A1* | 11/2018 | Horng | A61B 5/0507 |
| 2019/0346549 | A1* | 11/2019 | Chen | G01V 8/20 |

OTHER PUBLICATIONS

K. W. Wong, A. K. Y. Lai and X. Zeng, "Comments, with reply, on 'Full 360 degrees phase shifting of injection-locked oscillators' by X. Zhang and A. S. Daryoush," in IEEE Microwave and Guided Wave Letters, vol. 3, No. 7, pp. 230-232, Jul. 1993, doi: 10.1109/75.222785. (Year: 1993).*

M. Jezewski, "An approach to the analysis of injection-locked oscillators," in IEEE Transactions on Circuits and Systems, vol. 21, No. 3, pp. 395-401, May 1974, doi: 10.1109/TCS.1974.1083873. (Year: 1974).*

Z. Ahmad and J. Hesselbarth, "Probing concept for an antenna array for 60 GHz band," 2017 47th European Microwave Conference (EuMC), 2017, pp. 1325-1328, doi: 10.23919/EuMC.2017.8231096. (Year: 2017).*

Wang et al, "Concurrent Vital Sign and Position Sensing of Multiple Individuals Using Self-Injection-Locked Tags and Injection-Locked I/Q Receivers With Arctangent Demodulation," in IEEE Transactions on Microwave Theory and Techniques, vol. 61, No. 12, pp. 4689-4699, Dec. 2013 (Year: 2013).*

Taiwanese Office Action dated Feb. 4, 2021 for Taiwanese Patent Application No. 109116455, 5 pages.

* cited by examiner

PHASED-ARRAY DOPPLER RADAR USING AN INJECTION-LOCKING TECHNIQUE

FIELD OF THE INVENTION

This invention generally relates to a phased-array Doppler radar, and more particularly to a phased-array Doppler radar using an injection-locking technique.

BACKGROUND OF THE INVENTION

Doppler radar is a device that detects a target's movement based on the Doppler effect. The movement of the target with respect to the Doppler radar varies the phase difference between the radar signal transmitted to the target and the echo signal reflected from the target. This variation of the phase difference with the target's movement is known as the Doppler phase shift, which is used to measure the instantaneous displacement of the target.

As described in U.S. Pat. No. 9,846,226 entitled "Motion Detection Device", an injection-locked Doppler radar is provided to detect a human gesture using the signal from a wireless communication device, and thus not require an internal source. The disclosed Doppler radar has the advantages of low power consumption and no interference with the wireless communication device. However, the Doppler radar still has a limitation for use because it can only detect a single moving target.

SUMMARY

By combining the phased-array and injection-locking techniques, an external radio signal that is transmitted to and reflected from multiple targets is received by a receive antenna array and then demodulated by a plurality of quadrature demodulators with an injection-locked local oscillator to produce a plurality of in-phase (I) and quadrature (Q) signals from which the vital signs of multiple targets or the images of multiple parts of a target can be separated from each other using digital beamforming.

One aspect of the present invention provides a phased-array Doppler radar including a two-way splitter, a transmit antenna, a receive antenna array, an injection-locked oscillator (ILO), a demodulation unit and a digital signal processing unit. The two-way splitter receives and splits a reference signal into two parts. The transmit antenna is electrically connected to the two-way splitter to transmit one part of the reference signal to an area as a transmitted signal. The receive antenna array receives a plurality of reflected signals from the area as a plurality of received signals. The ILO is electrically connected to the two-way splitter to receive and be injected with the other part of the reference signal, and thus generates an injection-locked signal. The demodulation unit is electrically connected to the receive antenna array and the ILO to receive the plurality of received signals and the injection-locked signal. The demodulation unit demodulates the plurality of received signals into a plurality of baseband I/Q signals by using the injection-locked signal as a local oscillator signal. The digital signal processing unit is electrically connected to the demodulation unit to receive and process the plurality of baseband I/Q signals to obtain a digital beamforming pattern.

In the phased-array Doppler radar of the present invention, the digital beamforming pattern is provided to capture the vital signs of different targets or the images of different parts of a target in the area, and the ILO is provided to enable the phased-array Doppler radar to detect the target(s) with an external radio signal rather than an internal source signal. To sum up, the present invention has not only high detection performance but also great potential to facilitate a joint radar and communication system.

DETAILED DESCRIPTION OF THE INVENTION

Figure 1:
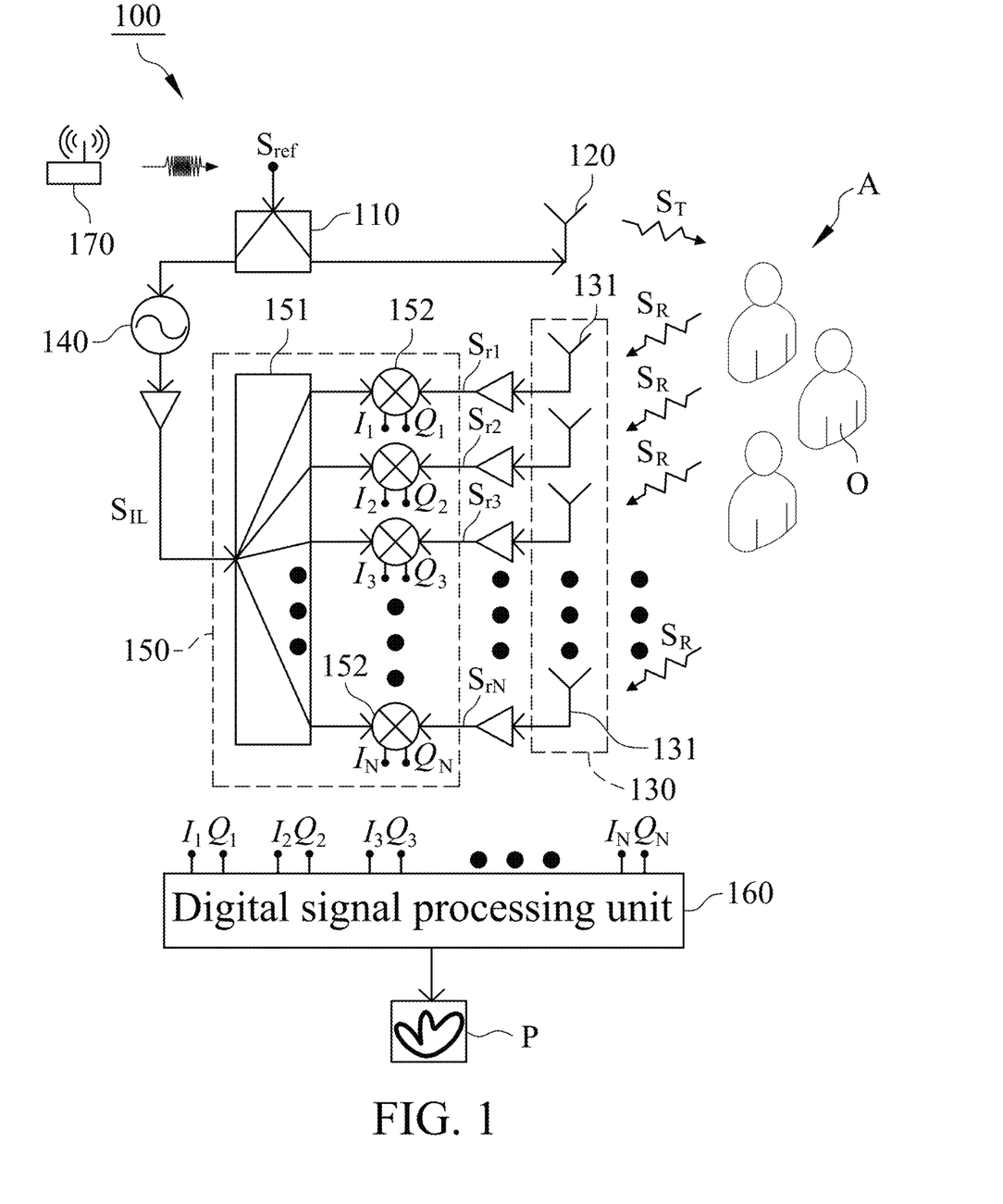
FIG. 1 is a circuit diagram illustrating a phased-array Doppler radar in accordance with a first embodiment of the present invention.

FIG. 1 is a circuit diagram illustrating a phased-array Doppler radar 100 in accordance with a first embodiment of the present invention. The phased-array Doppler radar 100 includes a two-way splitter 110, a transmit antenna 120, a receive antenna array 130, an injection-locked oscillator (ILO) 140, a demodulation unit 150 and a digital signal processing unit 160. In this embodiment, the receive antenna array 130 is placed horizontally.

The two-way splitter 110 of the first embodiment receives and divides a reference signal $S_{ref}$ into two parts. The reference signal $S_{ref}$ is preferably received by the two-way splitter 110 from a radio communication device 170 so that it contains communication information. For instance, the reference signal $S_{ref}$ is a Wi-Fi signal from a mobile device or an access point and is received by the two-way splitter 110 via wire or wireless transmission.

The transmit antenna 120 is electrically connected to the two-way splitter 110 to transmit one part of the reference signal $S_{ref}$ to an area A as a transmitted signal $S_T$. There is (are) a (multiple) target(s) O in the area A, and a plurality of reflected signals $S_R$ are reflected from the target(s) O. The receive antenna array 130 includes a plurality of receive antennas 131 that are provided to receive the plurality of reflected signals $S_R$ as a plurality of received signals $S_{r1} \sim S_{rN}$. While the target(s) O has (have) movements with respect to the transmit antenna 120, the plurality of received signals $S_{r1} \sim S_{rN}$ contains the Doppler phase shifts caused by the movements of the target(s) O.

The ILO 140 is electrically connected to the two-way splitter 110 to receive and be injected with the other part of the reference signal $S_{ref}$ so that it enters an injection-locked state and thus outputs an injection-locked signal $S_{IL}$. The reference signal $S_{ref}$, if delivered from the radio communication device 170, may contain a phase modulation component. The ILO 140 under the injection-locked state is equivalent to a cascade of a bandpass filter and a phase-modulation amplifier, which amplifies the phase modulation component of the reference signal $S_{ref}$ within an injection-locking bandwidth of the ILO 140. The injection-locking bandwidth of the ILO 140 is usually very small so most of the phase modulation component of the reference signal $S_{ref}$ is filtered out. Therefore, the injection-locked signal $S_{IL}$ functions as a local oscillator signal with low phase variation for demodulating the plurality of received signals $S_{r1} \sim S_{rN}$.

The demodulation unit 150 of the first embodiment includes a multi-way splitter 151 and a plurality of quadrature demodulators 152. The multi-way splitter 151 has a plurality of output ports and it is electrically connected to the ILO 140 to receive and split the injection-locked signal $S_{IL}$ into a plurality of parts. Each of the plurality of quadrature demodulators 152 is electrically connected to one of the plurality of receive antennas 131 to receive one of the plurality of received signals $S_{r1} \sim S_{rN}$ and also electrically connected to one of the plurality of output ports of the multi-way splitter 151 to receive one of the plurality of parts of the injection-locked signal $S_{IL}$. The number of the plurality of quadrature demodulators 152 is the same as that of the plurality of receive antennas 131 and also that of the plurality of output ports of the multi-way splitter 151. Each of the plurality of quadrature demodulators 152 is provided to demodulate one of the plurality of received signals $S_{r1} \sim S_{rN}$ using one of the plurality of parts of the injection-locked signal $S_{IL}$ as the local oscillator signal into one of a plurality of baseband I/Q signals $I_1/Q_1 \sim I_N/Q_N$.

Preferably, the plurality of received signals $S_{r1} \sim S_{rN}$ and the injection-locked signal $S_{IL}$ are amplified by amplifiers. Moreover, since the plurality of received signals $S_{r1} \sim S_{rN}$ contains the Doppler phase shifts caused by the movements of the target(s) O and the phase modulation component of the reference signal $S_{ref}$, the mixing operation of the plurality of received signals $S_{r1} \sim S_{rN}$ with the plurality of parts of the injection-locked signal $S_{IL}$ in the demodulation unit 150 cancels the phase modulation component within the injection-locking bandwidth. Therefore, the plurality of baseband I/Q signals $I_1/Q_1 \sim I_N/Q_N$ contains the Doppler phase shifts caused by the movements of the target(s) O and the phase modulation component outside the injection-locking bandwidth, where the former is preserved for use and the latter is filtered out in the digital signal processing unit 160.

The digital signal processing unit 160 is electrically connected to the demodulation unit 150 to receive and process the plurality of baseband I/Q signals $I_1/Q_1 \sim I_N/Q_N$ to obtain a digital beamforming pattern P. In this embodiment, the digital beamforming pattern P is derived from the following equation:

$$P(\phi) = \sum_{n=0}^{N-1} S_n e^{j\frac{2\pi}{\lambda}(nd_r \cos\phi)}$$

where $P(\phi)$ is the digital beamforming pattern P as a function of azimuth angle $\phi$, N is the number of the plurality of receive antennas 131, $S_n$ is the nth one of the plurality of baseband I/Q signals $I_1/Q_1 \sim I_N/Q_N$ in digital complex form, $\lambda$ is a wavelength of the plurality of received signals $S_{r1} \sim S_{rN}$, and $d_r$ is a distance between two adjacent ones of the plurality of receive antennas 131. The digital beamforming pattern P results from the detection of the target(s) O in the area A with the phased-array Doppler radar 100 of the first embodiment. The azimuth angles of the target(s) O in the area A can be thus identified at the peaks of the digital beamforming pattern P.

Figure 2:
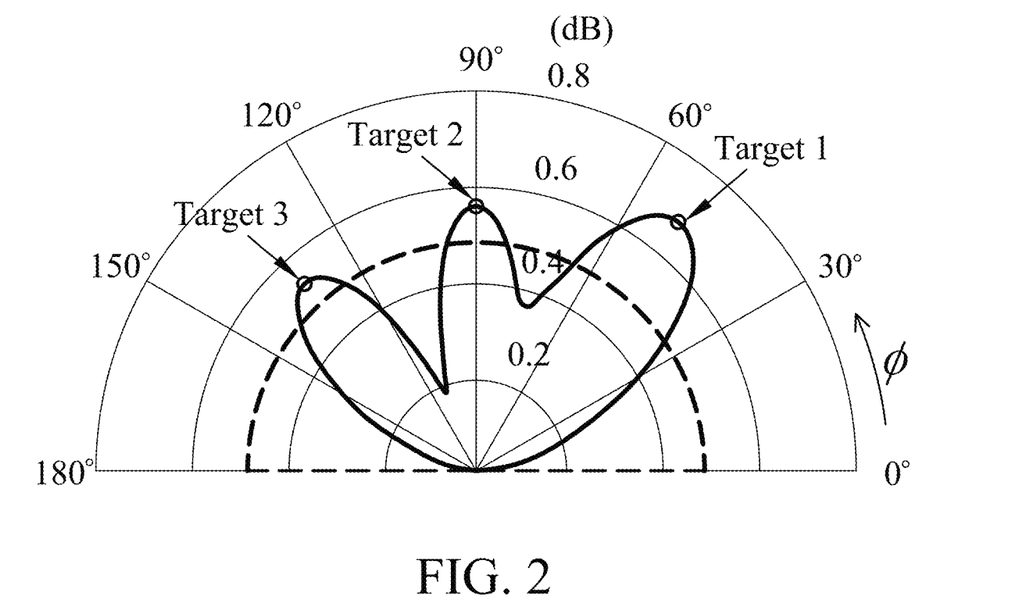
FIG. 2 shows a digital beamforming pattern produced by the phased-array Doppler radar in accordance with the first embodiment of the present invention.

FIG. 2 shows the digital beamforming pattern P that is produced by the phased-array Doppler radar 100 of the first embodiment. The targets O are three seated adults who face the radar and are located at a distance of 1 meter and azimuth angles of 50°, 90° and 130° from the radar. It can be seen from FIG. 2 that there are three peaks at the azimuth angles of 50°, 90° and 130°, which agrees with the azimuth angles of the targets O.

Figure 3A:
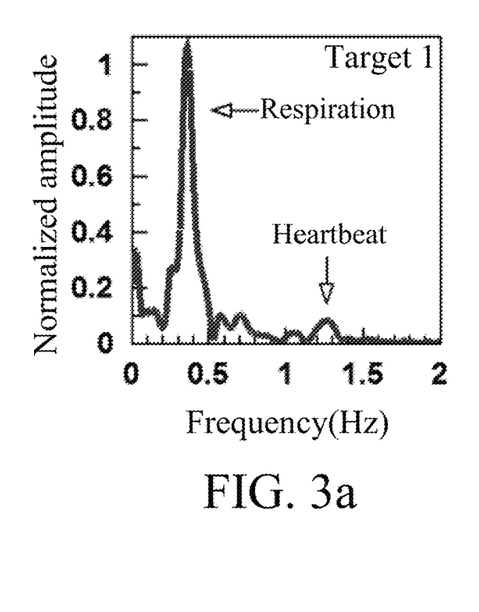
FIGS. 3a to 3c show the detected vital signs of different targets using the phased-array Doppler radar in accordance with the first embodiment of the present invention.
Figure 3B:
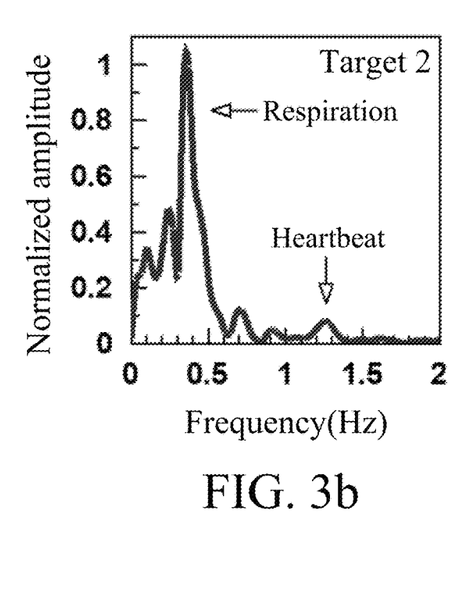
Figure 3C:
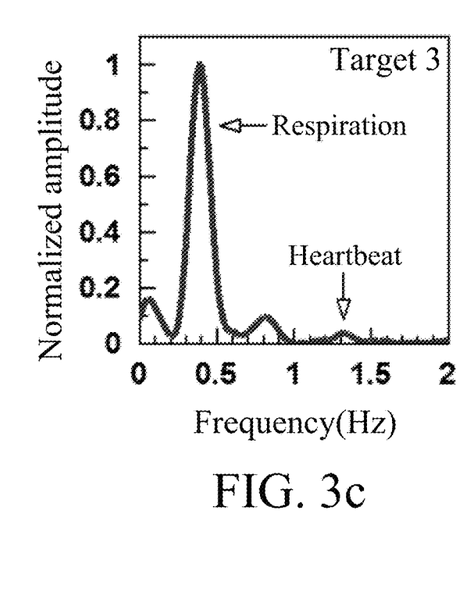

The digital signal processing unit 160 can further extract vital signs of the targets O in the area A from the time variations in the digital beamforming pattern P at those peak azimuth angles (i.e., 50°, 90° and 130°). As a result, FIGS. 3a to 3c show the Fourier spectra of the extracted vital signs of the three seated adults, where their respiration and heartbeat frequencies can be clearly identified in their corresponding spectra. This result demonstrates that the phased-array Doppler radar 100 of the first embodiment is able to capture the vital signs of different targets.

Figure 4:
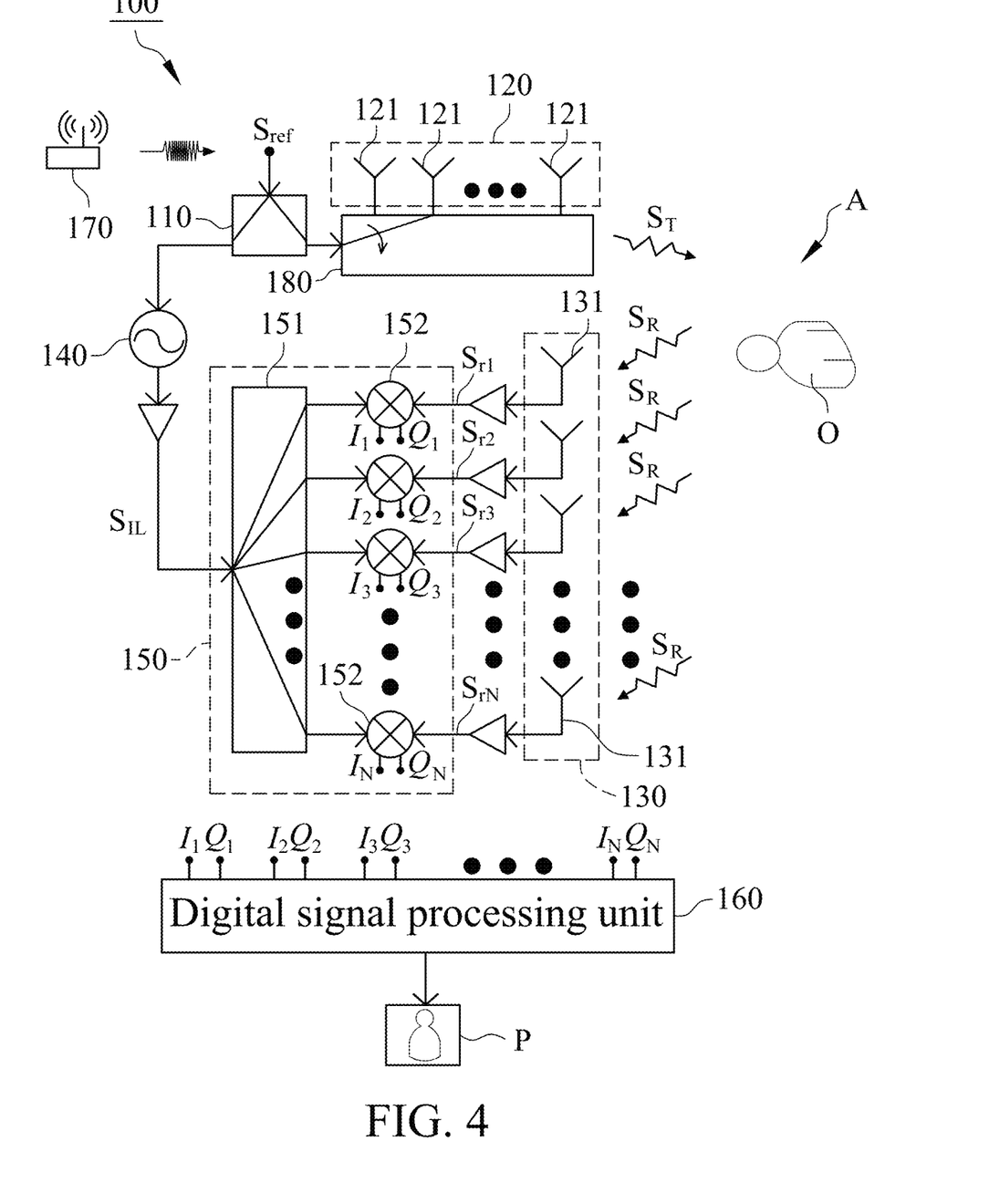
FIG. 4 is a circuit diagram illustrating a phased-array Doppler radar in accordance with a second embodiment of the present invention.

A phased-array Doppler radar 100 of a second embodiment of the present invention shown in FIG. 4 differs from that of the first embodiment of the present invention by including a transmit antenna array 120 and a switch 180. The switch 180 is electrically connected to the two-way splitter 110 to receive one part of the reference signal $S_{ref}$. The transmit antenna array 120 includes a plurality of transmit antennas 121 that are electrically connected to the switch 180 to transmit one part of the reference signal $S_{ref}$ via the switch 180 to the area A as the transmitted signal $S_T$. The transmitted signal $S_T$ is transmitted from different ones of the plurality of transmit antennas at different times. In this embodiment, the transmit antenna array 120 is placed vertically.

Figure 5:
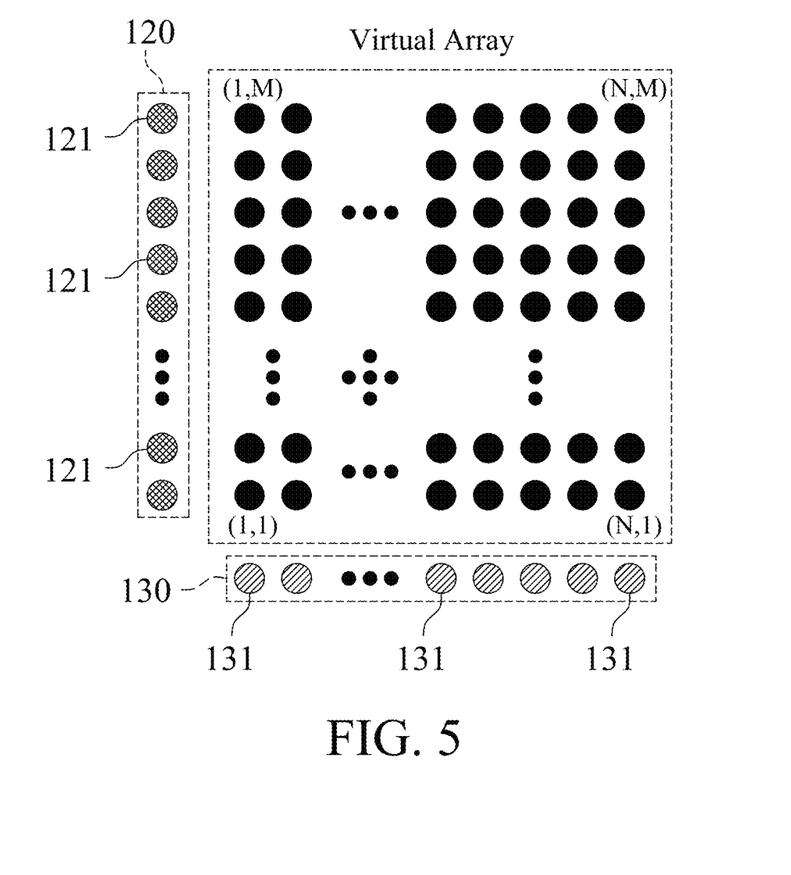
FIG. 5 is a diagram illustrating an equivalent two-dimensional phased array in accordance with the second embodiment of the present invention.

In the second embodiment, the axes of the transmit antenna array 120 and the receive antenna array 130 are perpendicular to each other. Such a combination of the transmit antenna array 120 and the receive antenna array 130 is equivalent to a two-dimensional phased array based on time division multiplexing principle, as shown in FIG. 5, where M and N denote the number of the plurality of transmit antennas 121 and the plurality of receive antennas 131, respectively. In this embodiment, the digital beamforming pattern P is derived from the following equation:

$$P(\theta, \phi) = \sum_{m=0}^{M-1} \sum_{n=0}^{N-1} S_{mn} e^{j\frac{2\pi}{\lambda}(md_t \cos\theta + nd_r \cos\phi)}$$

where $P(\theta, \phi)$ is the digital beamforming pattern P as a function of elevation angle $\theta$ and azimuth angle $\phi$, $S_{mn}$ is the nth one of the plurality of baseband I/Q signals $I_1/Q_1 \sim I_N/Q_N$ in digital complex form during the transmission period of the mth one of the plurality of transmit antennas 121, and $d_t$ is a distance between two adjacent ones of the plurality of transmit antennas 121. This equation indicates that the digital beamforming pattern P is two-dimensional so it can be used to capture the images of different parts of the target(s) O in the area A.

Figure 6:
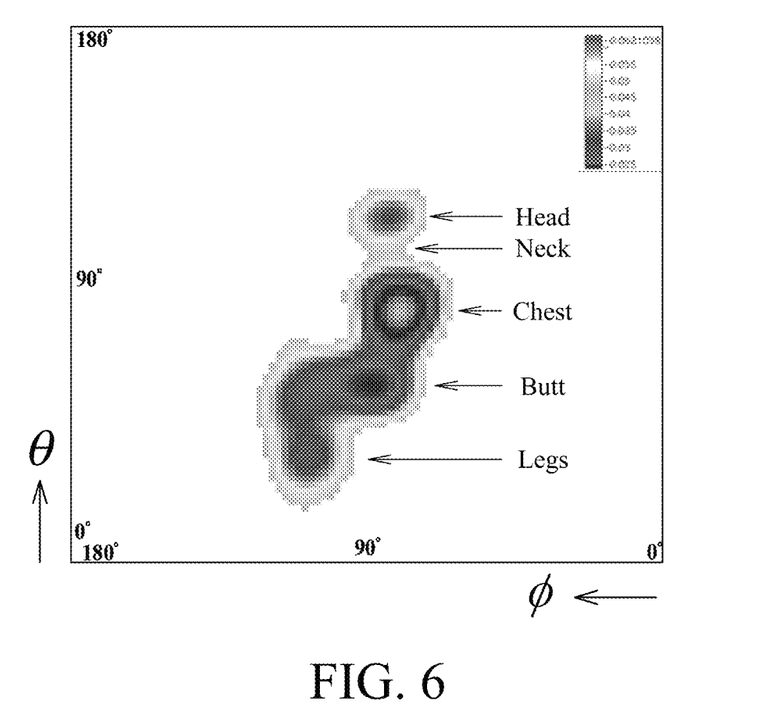
FIG. 6 shows the detected image of the target using the phased-array Doppler radar in accordance with the second embodiment of the present invention.

FIG. 6 shows the digital beamforming pattern P that is produced by the phased-array Doppler radar 100 of the second embodiment. The target O is an adult seated about 1.5 m from the radar placed on his left side. It is seen from FIG. 6 that the sitting posture of the target O is well recognized based on the captured images of head, neck, chest, butt and legs. This result demonstrates that the phased-array Doppler radar 100 of the second embodiment is able to capture the images of different parts of the target O.

In the phased-array Doppler radar of the present invention, the digital beamforming pattern P is provided to capture the vital signs or images of the target(s) O in the area A, and the ILO 140 is provided to enable the phased-array Doppler radar 100 to detect the target(s) O with an external radio signal rather than an internal source signal. To sum up, the present invention has not only high detection performance but also great potential to facilitate a joint radar and communication system.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A phased-array Doppler radar comprising:
a two-way splitter configured to receive and split a reference signal into two parts;
a transmit antenna electrically connected to the two-way splitter and configured to transmit one part of the reference signal to an area as a transmitted signal, a plurality of reflected signals is reflected from the area;
a receive antenna array configured to receive the plurality of reflected signals as a plurality of received signals, wherein the receive antenna array includes a plurality of receive antennas that are configured to receive the plurality of reflected signals as the plurality of received signals, the receive antenna array is configured to be placed horizontally;
an injection-locked oscillator (ILO) electrically connected to the two-way splitter, the ILO is configured to receive and be injected with the other part of the reference signal and configured to generate an injection-locked signal;
a demodulation unit electrically connected to the receive antenna array and the ILO, the demodulation unit is configured to receive the plurality of received signals and the injection-locked signal and configured to demodulate the plurality of received signals into a plurality of baseband I/Q signals by using the injection-locked signal as a local oscillator signal,
wherein the demodulation unit includes a multi-way splitter and a plurality of quadrature demodulators, the multi-way splitter that has a plurality of output ports is electrically connected to the ILO and configured to receive and split the injection-locked signal into a plurality of parts, each of the plurality of quadrature demodulators is electrically connected to one of the plurality of receive antennas and one of the plurality of output ports of the multi-way splitter and configured to receive one of the plurality of received signals and one of the plurality of parts of the injection-locked signal, each of the plurality of quadrature demodulators is further configured to demodulate one of the plurality of received signals using one of the plurality of parts of the injection-locked signal as the local oscillator signal into one of the plurality of baseband I/Q signals; and a digital signal processing unit electrically connected to the demodulation unit, the digital signal processing unit is configured to receive and process the plurality of baseband I/Q signals to obtain a digital beamforming pattern.

2. The phased-array Doppler radar in accordance with claim 1, wherein the reference signal is a radio signal that is configured to be delivered from a radio communication device to the two-way splitter via wire or wireless transmission.

3. The phased-array Doppler radar in accordance with claim 1, wherein the digital beamforming pattern is derived from the following equation:

$$P(\phi) = \sum_{n=0}^{N-1} S_n e^{j\frac{2\pi}{\lambda}(nd_r\cos\phi)}$$

where P ($\phi$) is the digital beamforming pattern as a function of azimuth angle $\phi$, N is the number of the plurality of receive antennas, $S_n$, is the nth one of the plurality of baseband I/O signals in digital complex form, $\gamma$ is a wavelength of the plurality of received signals, and $d_r$ is a distance between two adjacent ones of the plurality of receive antennas.

4. The phased-array Doppler radar in accordance with claim 3, wherein the digital signal processing unit is configured to extract vital signs of at least one target in the area from the digital beamforming pattern.

5. The phased-array Doppler radar in accordance with claim 1 comprising a plurality of transmit antennas forming a transmit antenna array and a switch, wherein the switch is electrically connected to the two-way splitter to receive one part of the reference signal, the plurality of transmit antennas are electrically connected to the switch to transmit one part of the reference signal via the switch to the area as the transmitted signal. The transmitted signal is transmitted from different ones of the plurality of transmit antennas at different times.

6. The phased-array Doppler radar in accordance with claim 5, wherein the transmit antenna array is configured to be placed vertically, the digital beamforming pattern is derived from the following equation:

$$P(\theta, \phi) = \sum_{m=0}^{M-1} \sum_{n=0}^{N-1} S_{mn} e^{j\frac{2\pi}{\lambda}(md_t\cos\theta + nd_r\cos\phi)}$$

where P($\theta$,$\phi$) is the digital beamforming pattern as a function of elevation angle and azimuth angle, $S_{mn}$ is the nth one of the plurality of baseband I/Q signals in digital complex form during the transmission period of the mth one of the plurality of transmit antennas, and $d_t$ is a distance between two adjacent ones of the plurality of transmit antennas.

7. The phased-array Doppler radar in accordance with claim 6, wherein the digital signal processing unit is configured to construct images of different parts of at least one target in the area from the digital beamforming pattern.

* * * * *